United States Patent
Gryspeerdt

(10) Patent No.: US 6,447,394 B1
(45) Date of Patent: Sep. 10, 2002

(54) AXIAL FLOW COMBINE SEPARATOR UPPER GUIDE COVER WITH FIN PITCH ANGLE

(75) Inventor: José G. T. Gryspeerdt, Poesele (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/857,810

(22) PCT Filed: Nov. 24, 2000

(86) PCT No.: PCT/EP00/12072
§ 371 (c)(1),
(2), (4) Date: Jun. 11, 2001

(87) PCT Pub. No.: WO01/37638
PCT Pub. Date: May 31, 2001

(30) Foreign Application Priority Data

Nov. 26, 1999 (GB) .............................................. 9927839

(51) Int. Cl.$^7$ ................................................. A01F 12/28
(52) U.S. Cl. ......................................... 460/109; 460/66
(58) Field of Search ............................. 460/66, 69, 71, 460/16, 108, 107, 25, 32, 34, 35, 45, 58; 56/14.6

(56) References Cited

U.S. PATENT DOCUMENTS

| | | | | |
|---|---|---|---|---|
| 3,626,472 A | * | 12/1971 | Rowland-Hill | 460/70 |
| 3,742,686 A | * | 7/1973 | Rowland-Hill | 56/12.9 |
| 3,995,645 A | * | 12/1976 | Rowland-Hill | 460/68 |
| 4,186,753 A | * | 2/1980 | Todd | 460/69 |
| 4,258,726 A | * | 3/1981 | Glasser et al. | 460/109 |
| 4,306,572 A | * | 12/1981 | Campbell et al. | 460/69 |
| 4,499,908 A | * | 2/1985 | Niehaus | 460/108 |
| 4,541,441 A | * | 9/1985 | Ichikawa et al. | 460/66 |
| 4,739,773 A | * | 4/1988 | West et al. | 460/16 |

FOREIGN PATENT DOCUMENTS

| | | | | |
|---|---|---|---|---|
| EP | 0522268 A2 | * | 1/1993 | A01F/12/44 |
| FR | 2451702 | * | 10/1980 | A01F/12/18 |
| GB | 1399602 | * | 7/1975 | A01F/7/06 |

* cited by examiner

Primary Examiner—Thomas B. Will
Assistant Examiner—Árpád Fábián Kovács
(74) Attorney, Agent, or Firm—John William Stader; Larry W. Miller

(57) ABSTRACT

A combine harvester comprises a threshing and separating arrangement mounted to a main frame, which includes a generally cylindrical chamber having a generally longitudinal axis and comprising a separating concave assembly and an upper guide cover provided with fins arranged to move harvested crop material along a helical path inside the chamber. The threshing and separating arrangement further comprises a rotor assembly mounted for rotation in the chamber and comprising a generally cylindrical rotor body with a separating section associated with the separating concave assembly and having a circumscribed diameter D. The pitch angle α of the rotor fins has been optimized with respect to power requirements and rotor losses.

3 Claims, 5 Drawing Sheets

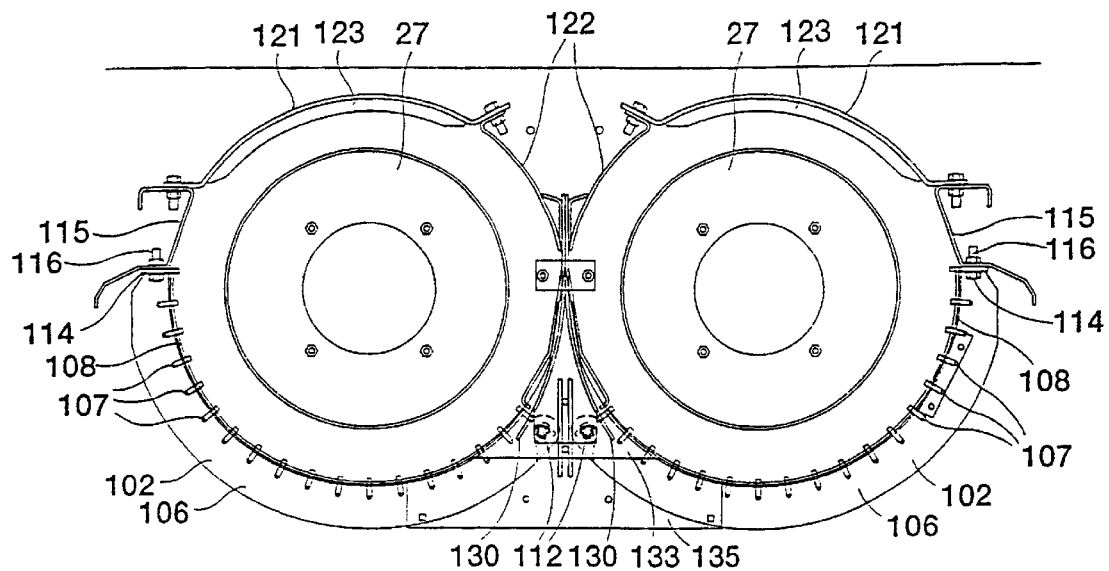
FIG. 3
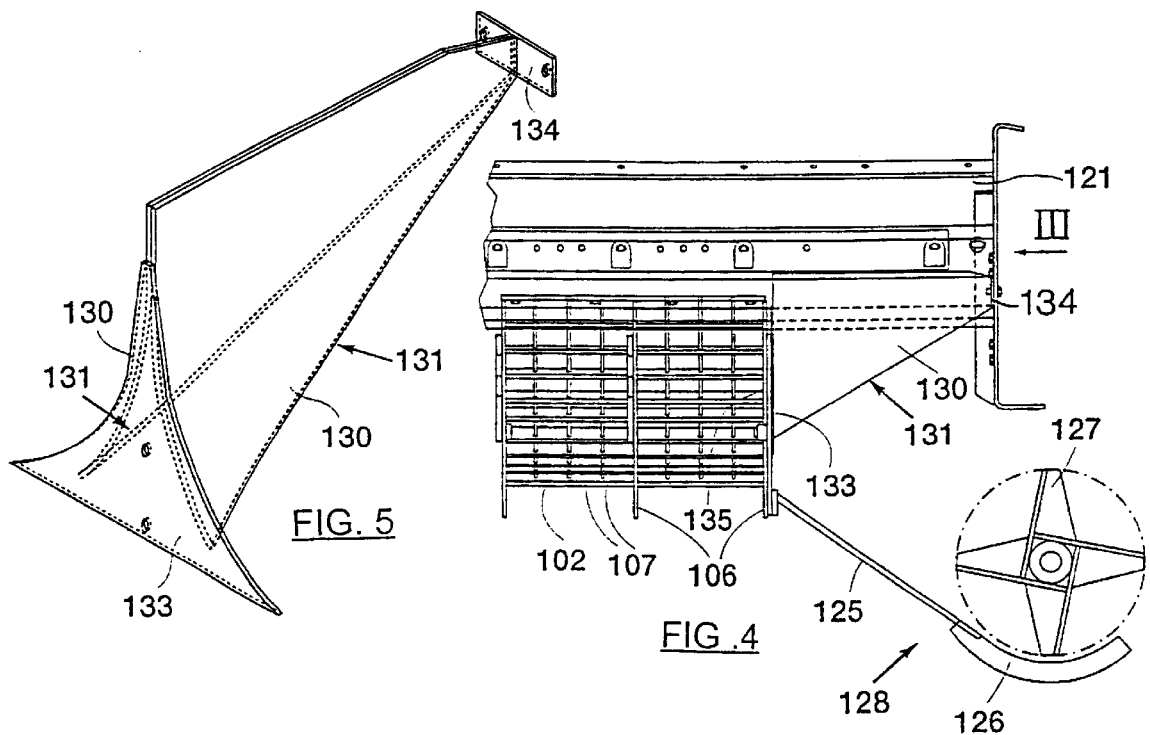
FIG. 5
FIG. 4

FIG. 7
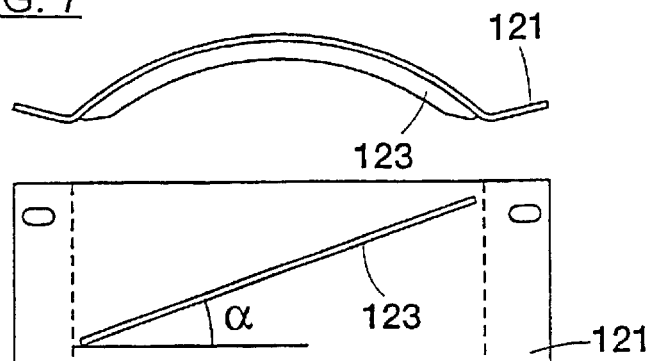
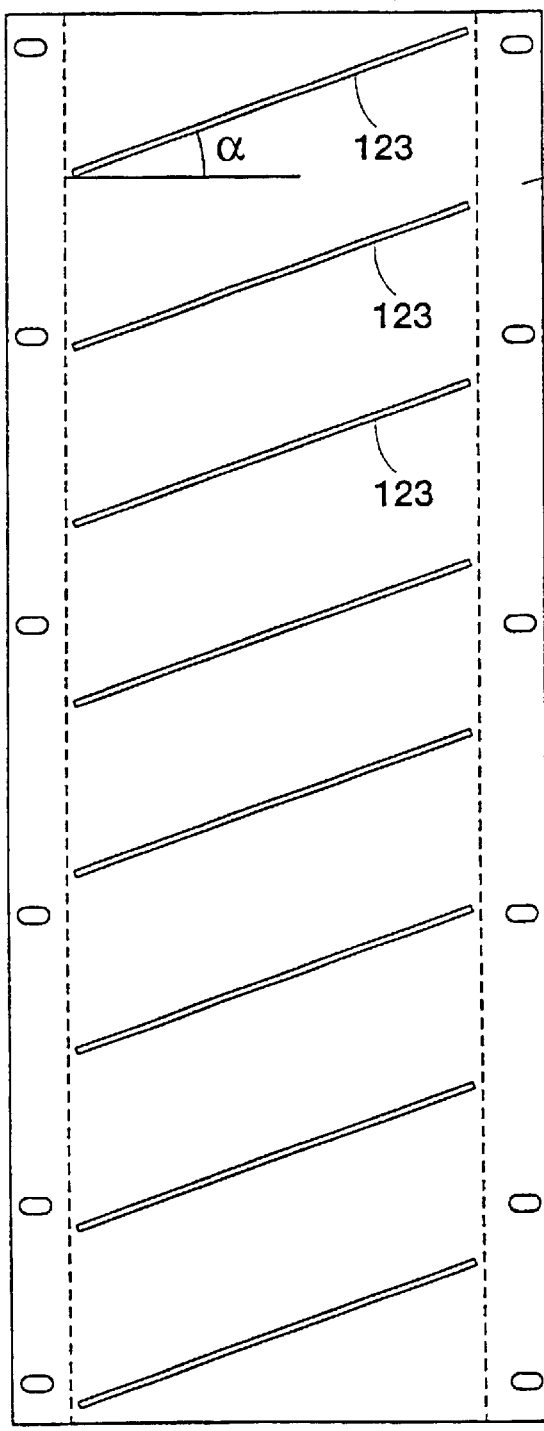
FIG. 6

AXIAL FLOW COMBINE SEPARATOR UPPER GUIDE COVER WITH FIN PITCH ANGLE

TECHNICAL FIELD OF THE INVENTION

The present invention relates to agricultural harvesters and, more particularly, to axial flow combine harvesters having a threshing and separating unit with at least one generally longitudinally arranged rotor for advancing crop material along a generally helical path.

BACKGROUND ART

In conventional combine harvesters crop material is fed between a threshing cylinder and an associated threshing concave, which extend transversely to the direction of combine travel. Hereby the crop is threshed over a comparatively short distance. Axial flow machines use one or more longitudinally arranged rotors which are rotated in associated chambers which are partly constituted by threshing and separating concaves. The crop material is subjected to a much longer threshing and separating action than in a conventional machine and therefore, the efficiency of axial flow machines is greater because a higher degree of separation is reached and the grain losses are reduced.

The concaves are provided above a cleaning system and constitute the lower portion of the chamber. The top portion thereof comprises a curved cover which has at its inner surface a set of fins to guide the crop rearwardly along a spiral path to the end of the threshing and separating system.

The pitch angle of the fins has a direct influence on the time interval the crop remains inside the chamber and hence on the chances for the grains to be separated from the straw. A larger pitch angle will increase the rearward speed of the crop flow and the portion of the grains that is not separated through the concaves and deposited onto the field (rotor losses). A smaller pitch angle will reduce the rearward speed, increase the dwelling time and reduce the rotor losses. However it is obvious that the increased amount of material around the threshing rotor also increases the power requirements for the rotor itself. So, apparently the rotor losses and rotor power requirements contradict each other when it comes to deciding which the pitch angle should be: chosen for the fins on the cover.

Nevertheless, there is a need for a threshing and separating apparatus which is efficient with respect to both the rotor power and the rotor losses.

SUMMARY OF THE INVENTION

According to present invention there is provided a combine harvester comprising:
 a main frame;
 a threshing and separating arrangement mounted to said main frame and including:
  a generally cylindrical chamber having a generally longitudinal axis and comprising a lower separating concave assembly and an upper guide cover provided with fins arranged to move harvested crop material along a helical path inside said chamber; and
  a rotor assembly mounted for rotation in said chamber and comprising a generally cylindrical rotor body with a separating section associated with said separating concave assembly and having a circumscribed diameter D;
 characterised in that said fins are arranged at a pitch angle α substantially equal to the angle following from the formula $(\tan \alpha)^4 \times D = 7.6$ mm.

For a rotor having a diameter substantially equal to 432 mm the angle α may be substantially equal to 20°. For a diameter of 559 mm the angle may be, equal to 19°.

DESCRIPTION OF THE FIGURES

A combine harvester in accordance with the present invention will now be described in greater detail, by way of example, with reference to the accompanying drawings, in which:

FIG. 3 is a rear view of the threshing and separating unit taken in the direction of arrow III in FIG. 4;

FIG. 4 is an enlarged side view of the rear section of the threshing and separating unit of FIG. 3, showing a combined guide plate;

FIG. 5 is a perspective view of the guide plate of FIG. 4;

FIG. 6 is a bottom view of a cover plate equipped with fins as mounted above the threshing and separating unit, as shown in FIG. 3;

FIG. 7 is a rear view of the cover plate of: FIG. 10;

DETAILED DESCRIPTION OF AN EMBODIMENT OF THE INVENTION

The terms "grain", "straw" and "tailings" are used principally throughout this specification for convenience at it is to be understood that these terms are not intended to be limiting. Thus "grain" refers to that part of the crop material which is threshed and separated from the discardable part of the crop material which is referred to as "straw". Incompletely threshed crop material is referred to as "tailings". Also the terms "forward", "rearward", "left" and "right", when used in connection with the combine harvester and/or components thereof are determined with reference to the direction of forward operative travel of the combine harvester, but again, they should not be construed as limiting. The terms "longitudinal" and "transverse" are determined with reference to the fore-and-aft direction of the harvester and are equally not to be construed as limiting.

Figure 1:
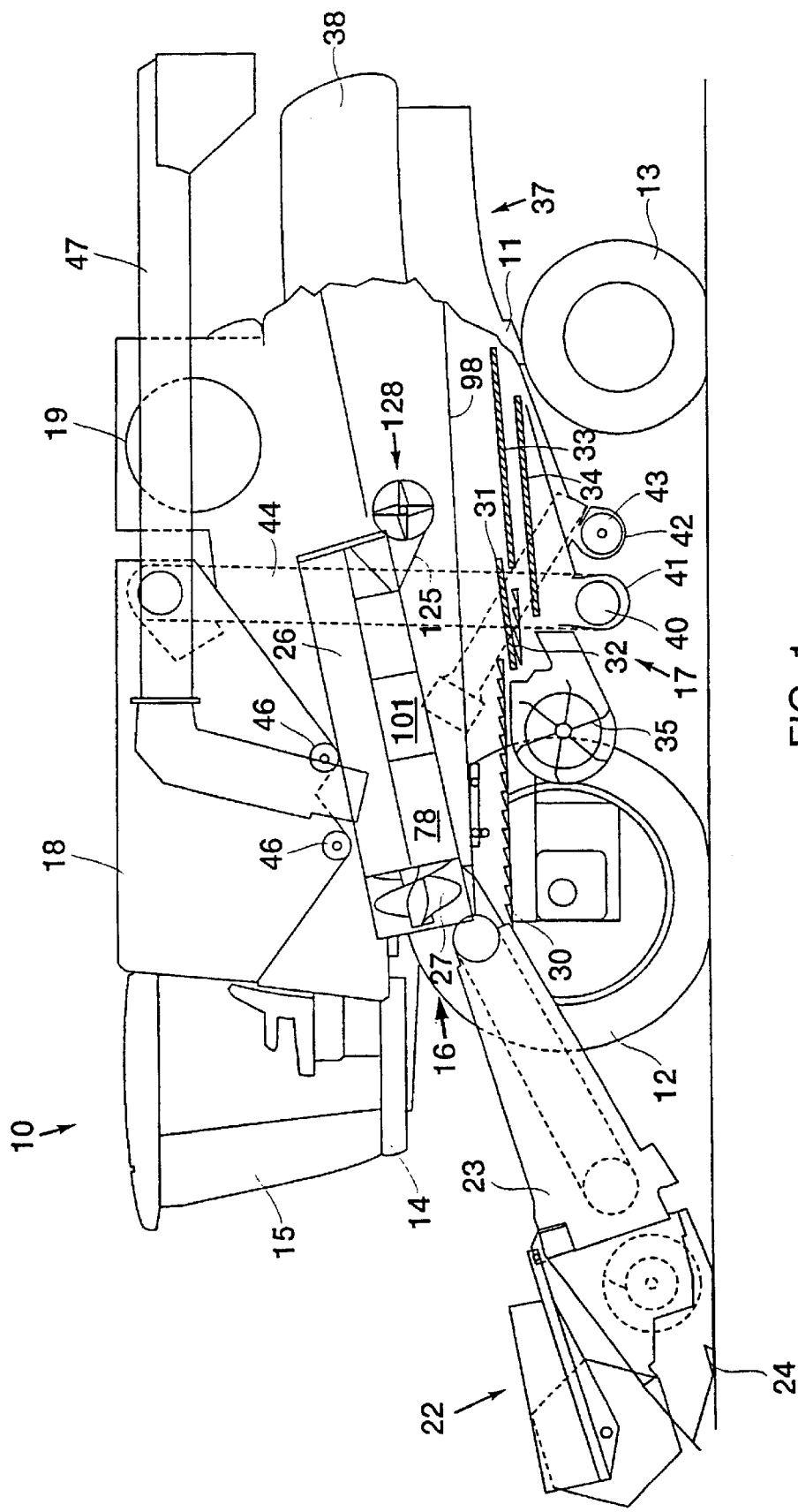
FIG. 1 is a diagrammatic, partly sectional side view of a combine harvester having an axial flow threshing and separating unit.

The combine harvester 10 shown in FIG. 1 of the accompanying drawings, 1s of the axial-flow type, wherein crop material is threshed and separated while it is advanced by and along a longitudinally arranged rotor. The combine harvester comprises a chassis or main frame 11 having a pair of driven, ground-engaging front wheels 12 and a pair of smaller, steerable rear wheels 13. Supported on the main frame 11 are an operator's platform 14 with an operator's cab 15, a threshing and separating assembly 16, a grain cleaning assembly 17, a grain tank 18 and a power plant or engine 19. A conventional header 22 and straw elevator 23 extend forwardly of the main chassis 11 and are pivotally secured thereto for generally vertical movement which is controlled by appropriate actuators, such as hydraulic cylinders (not shown).

As the combine harvester 10 is propelled forwardly over a field with standing crop, the latter is severed from the stubble by a sickle bar 24 at the front of the header 22, whereafter the header and the straw elevator 23 supply the cut crop to the threshing and separating assembly 16.

The threshing and separating assembly 16 comprises a pair of juxtaposed, generally cylindrical chambers 26 in which rotors 27 are rotated to thresh and separate the crop received therein, that is to say, the crop is rubbed and beaten between the rotors 27 and the inner surfaces of the chambers 26, whereby the grain, seed or the like, is loosened and separated from the straw. The chambers are described in further detail hereinafter.

Grain which has been separated by the threshing and separating assembly 16 falls onto a first grain pan 30 of the cleaning assembly 17 which further also comprises a pre-cleaning sieve 31, positioned above a second grain can 32, a pair of sieves 33, 34, disposed the one above the other, and a cleaning fan 35.

The grain pans 30, 32 and the sieves 31, 33, 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads said grain across said sieves 31, 33, 34, while permitting the passage of cleaned grain by gravity through the apertures of these sieves. The grain on the sieves 31, 33, 34 is subjected to a cleaning action by the fan 35 which provides an air flow through said sieves to remove chaff and other impurities such as dust from the grain by making this material airborne for discharge from the machine through an outlet 37 of the straw hood 38.

Clean grain falls to a clean grain auger 40 in a clean grain auger trough 41 and is subsequently transferred therefrom by a grain elevator 44 to the grain tank 18. Tailings fall to a tailings auger (not shown) in a tailings auger trough 42. The tailings are transported sideways by said tailings auger to a separate rethresher 43 and returned by a tailings conveyor to the cleaning assembly 17 for repeated cleaning action.

A pair of grain tank augers 46 at the bottom of the grain tank 18 is used to urge the clean grain sideways to an unloading tube 47 for discharge from the combine harvester 10.

The lower part of the chamber 26 of the threshing and separating assembly 16 comprises a plurality of concaves or grates allowing the passage of threshed and separated grain to the cleaning assembly 17. The front portion has a threshing concave assembly 78 which is disposed adjacent a threshing section of the rotor 27.

Figure 2:
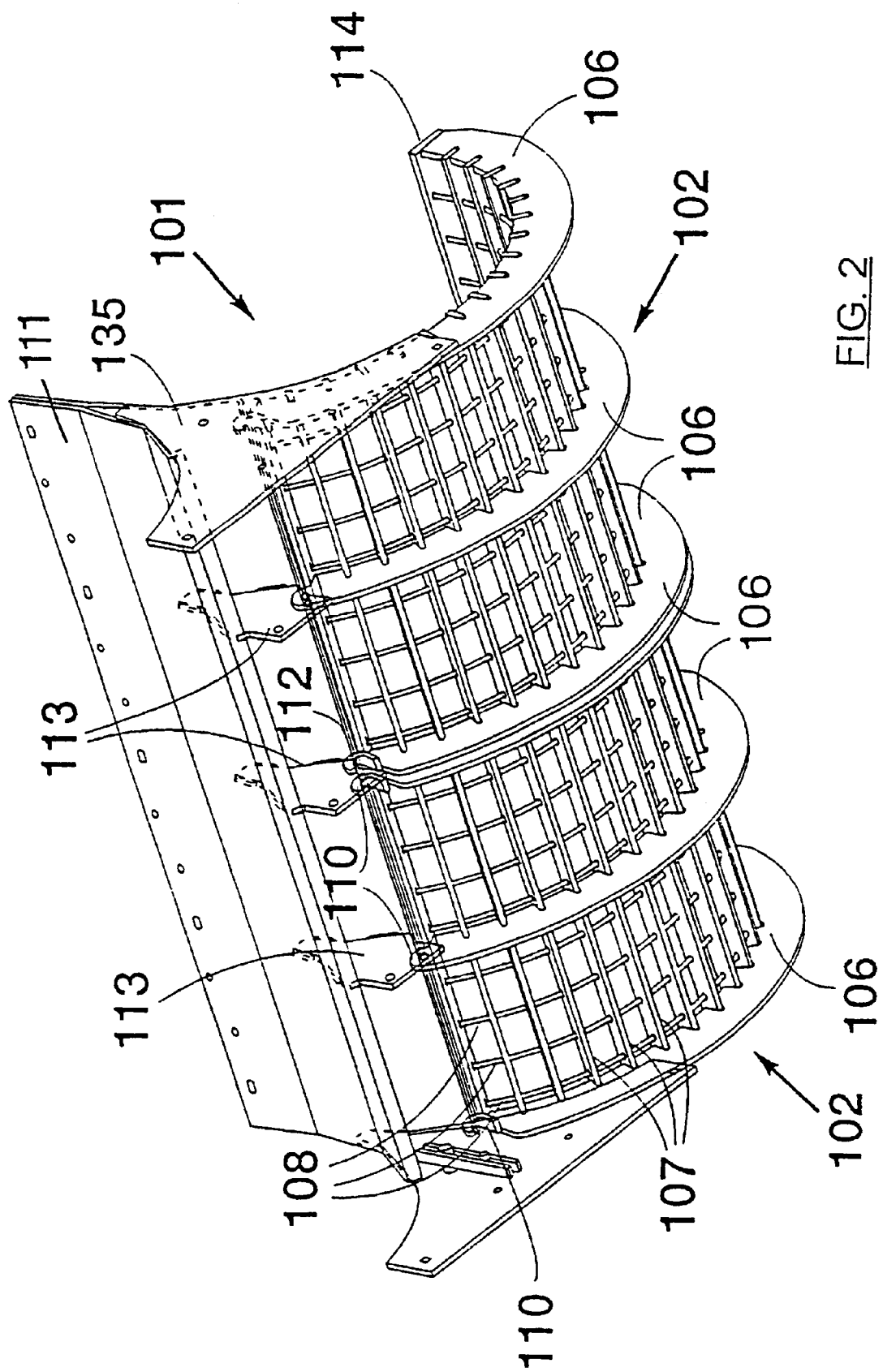
FIG. 2 is a perspective view of part of a separating grate of the threshing and separating unit of FIG. 1.

The chamber 26 has a rear portion including a separating concave assembly 101 disposed adjacent a separating section of the rotor 27. This concave assembly comprises a plurality of interchangeable separating concaves or grates 102. According to one embodiment, shown in FIG. 2, the concave assembly 101 comprises two separating grates 102, each having three transverse curved members 106, one at the front, one in the middle and one at the rear of the grate 102. The curved members are interconnected by a set of spaced, longitudinally arranged slats 107, through which extend a plurality of curved wires 108. The slats 107 are rectangular in cross-section, having their longest side oriented to the axis of the rotor 27. The inward edges are engaged by the crop material for continued threshing action while separating the grain and chaff from the straw.

The inner ends of the curved members 106 have hooks 110 which fit over appropriate mounting means at the centre of the threshing and separating assembly 16. in one embodiment these mounting means may be longitudinal rods 112 mounted through transverse plates 113 of the central framework 111 of the separating assembly. At their outer ends the curved members 106 are welded to a longitudinal flat iron 114 which has apertures for appropriate means such as bolts 116 (FIG. 3) for attaching the outer section of the grate 102 to a profile 115 of the separating assembly. The separating grate 102 can be removed from the harvester 10 after removal of a side panel adjacent the separating concave assembly 101. The bolts 116 are removed such that the outer side of the grate 102 can be lowered, whereafter the hooks 110 can be lifted off the central rod 112.

The upper section of the threshing and separating chambers 27 comprises curved cover plates 121 as shown in FIGS. 3, 4, 6 and 7. The cover plates 121 extend between and are bolted to the longitudinal profiles 115 and inner side walls 122 of the separating assembly 16. Each cover plate 121 is provided at its inner surface with a set of parallel vanes 123 which are arranged along spiral paths. The vanes 123 guide the threshed crop material rearwardly as it is rotated by the elements 68, 71 on the rotor tube 50. The pitch angle $\alpha$ at which the vanes 123 are disposed is critical with respect to two criteria: grain loss and power requirement. As this angle defines for the larger part the axial speed at which the crop material travels along the confines of the chamber 26, it also determines the dwelling time of the crop in the separating area, i.e. adjacent the separating concave assembly 101. A smaller pitch angle $\alpha$ will lower the axial speed of the crop and hence increases the opportunity for the grains to travel through the grates 102, 103 and reach the cleaning assembly 17. Accordingly it may be expected that a smaller percentage of the harvested grain will reach the end of the threshing and separating assembly 16 without being separated from the straw and hence be deposited together with the straw through the harvester outlet 37 onto the field. Hence it may be expected that grain losses at the end of the rotor 27 can be reduced by simply reducing the pitch angle $\alpha$.

On the other hand the pitch angle will influence the energy requirements for the rotation of the rotor 27. A smaller pitch angle increases the dwelling time and hence the amount of material resent around the separating section 58 of the rotor. Hence it may be expected that a smaller pitch angle $\alpha$ will raise the energy requirements for keeping the rotor 27 rotating at full speed.

Figure 8A:
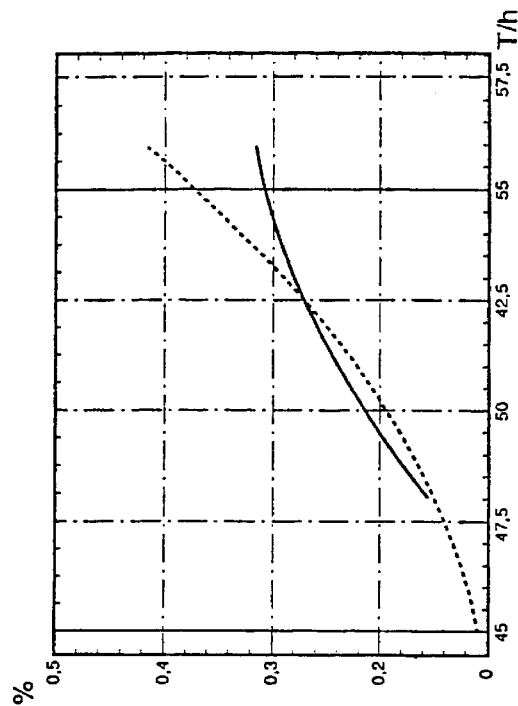
FIGS. 8A–D are graphs illustrating the effects of the diameter of the cylinder circumscribed by the rotor and the patch angle of the fins of the cover plate.
Figure 8B:
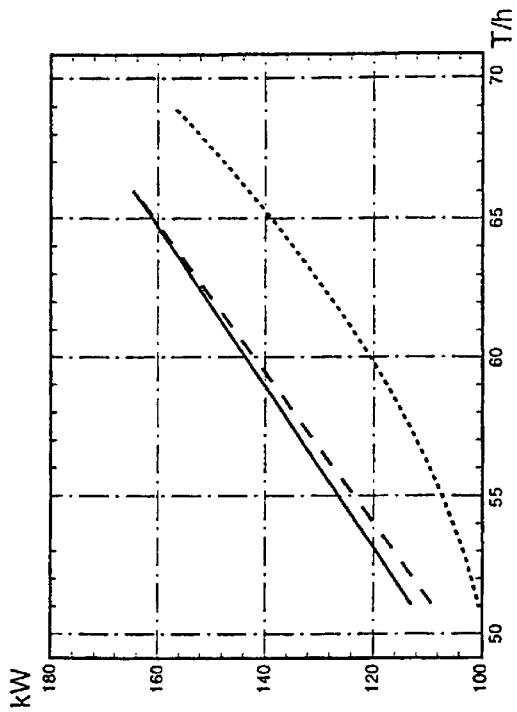
Figure 8C:
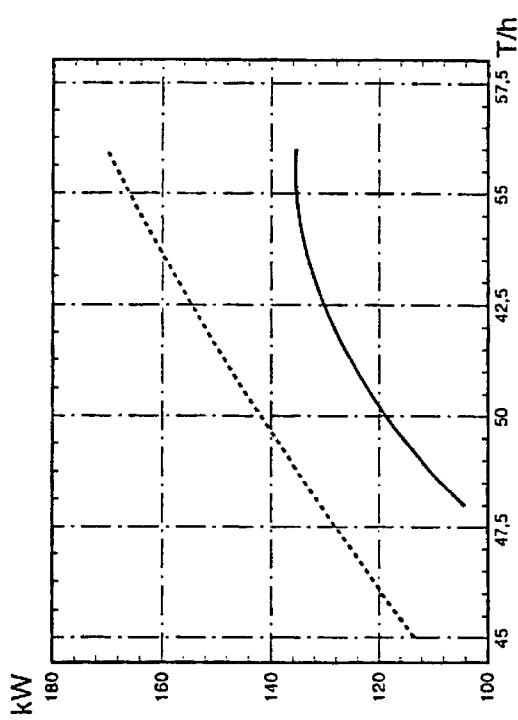

However it has been found that for various effective diameters of rotors and chambers, an angle $\alpha$ can be determined which provides optimum results both with respect to rotor losses and the required power. The graphs in FIGS. 8A and 8C show the relationship between the crop throughput (in Ton/h) and the energy requirement and between the throughput and the rotor losses (as a percentage of the total grain yield) respectively. These are the results of tests using a rotor having an effective diameter of 17" (432 mm) The full line represents the results for a cover plate having vanes 123 at an angle of 20°. The dotted line shows the results for an angle $\alpha$ of 18°. FIG. 8A clearly proves that the greater pitch angle reduces the energy requirement, as expected. However for a greater angle $\alpha$ the results with respect to rotor losses (FIG. 8C) do not vary significantly in the lower capacity range, and are even better in the higher capacity range. As an overall conclusion it can be stated that the pitch angle of 20° has definite advantages over the angle of 18°.

Figure 8D:
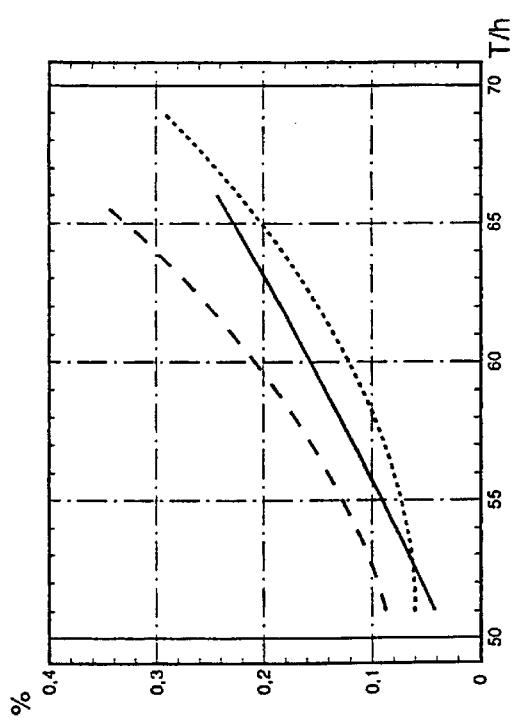

Analogous tests have been made using rotors having an effective diameter of 22" (559 mm). The results are shown in FIGS. 8B and 8D. Herein the full line represents the results for a pitch angle $\alpha$ of 17°, the dotted line for an angle of 19° and the dashed line for an angle of 21°. Herefrom it may be derived that reducing the pitch angle from 21° to 19° also reduces the rotor losses, as shown in FIG. 8B. However a still further reduction of the angle α does not yield a comparable positive result, as the losses for an angle of 17° are well above the losses for an angle of 19°. The power graphs in FIG. 8D show that power requirements are substantially the same for pitch angles of 17° and 21°, but that the power requirements are about 12% lower when the vanes are installed at a pitch angle of 19°. Hence the same angle α provides optimum results for both the rotor losses and the energy requirements.

The optimum angle is not the same for all rotor diameters. As a general rule the optimum angle decreases when the diameter increases. This non-linear relationship between the optimum angle α and the effective rotor diameter D can be defined as:

$$(\tan \alpha)^4 \times D = 7.6 \text{ mm}$$

At the end of the threshing and separating assembly 16, the straw is propelled rearwardly and outwardly by the paddles 74 on the rotors 27. The paddles do not deposit the straw directly onto the ground, but eject it onto a slanting guide plate 125, which is attached to the rear of the separating concave assembly 101, as shown in FIG. 4. The guide plate ends adjacent a transverse beater concave 126 of a beater assembly 128 which is positioned above the chaffer sieve 33. The beater assembly further comprises a transverse beater rotor 127 which is mounted above the concave 126 for engaging the straw which is delivered thereto by the guide plate 125 and for propelling the same through the outlet 37 at the rear of the combine harvester 10.

It is observed that the two counter-rotating rotors 27 tend to deposit most of the straw near the centre of the guide plate 125. For machines operating at high capacities this straw may build up and cause blockages in this portion of the combine harvester 10. Such blockages evolve quickly to the front of the threshing and separating assembly and may cause a complete blockage of the rotors 27. Therefore it is required to make use of the full capacity of the beater assembly 128 and hence to spread out the straw over the full width of the guide plate 125. To this end the rear portion of each rotor chamber 26 is provided with a curved guide plate 130, which generally has the shape of right-angled triangle, with one side which is positioned next to the rear end of the inner chamber walls 122. The edge 131 defining the slanting side of the triangle extends rearwardly and upwardly to the centre line of the rotor 27. As such this edge 131 is generally transverse to the direction of the flow of straw leaving the confines of the chamber 26. The curvature of the guide plate 130 is somewhat larger than the radius of the chamber walls 122. The bases of the triangular plates are welded onto a front support plate 133 which is bolted onto a rear plate 135 of the central framework 111 of the separating assembly. At their rear tips the curved guide plates 130 are joined together at a rear support plate 134, which is bolted onto the rear plate of the threshing and separating assembly 16. The upper edges of the triangular plates 131 extend generally at the level of the rotor axes, to which they are parallel.

The front section of the guide plate 131 deviates the straw that exits the separating assembly near the end of the grates 102 (or 103 as the case may be) by a larger angle than its rear section, which hardly has any effect on the exit direction of the straw. Consequently the front portion of the straw flow is directed to the sides of the slanted guide plate 125 while its rear portion is propelled downwardly onto the centre of the guide plate. Accordingly the material is spread evenly before it is engaged by the beater rotor 127. As accumulation in one or other section of the beater assembly 128 is prevented, the chances for blockage of the threshing and separating assembly 16 are reduced.

What is claimed is:

1. A combine harvester comprising:
   a main frame;
   a threshing and separating arrangement mounted to said main frame further comprising:
   a generally cylindrical chamber having a generally longitudinal axis and comprising a lower separating concave assembly and an upper guide cover provided with a series of fins arranged to move harvested crop material along a helical path inside said chamber; and
   a rotor assembly mounted for rotation in said chamber and comprising a generally cylindrical rotor body with a separating section associated with said lower separating concave assembly and having a circumscribed diameter D, wherein said fins are arranged at a pitch angle α substantially equal to the angle following from a formula $(\tan \alpha)^4 \times D = 7.6$ mm.

2. The combine harvester described in claim 1, wherein said diameter D is substantially equal to 432 mm and α is substantially equal to 20°.

3. The combine harvester described in claim 2, wherein said diameter D is substantially equal to 559 mm and α is substantially equal to 19°.

* * * * *